United States Patent [19]
Thornton

[11] 3,890,159
[45] June 17, 1975

[54] METHOD OF FORMING A HIGH SURFACE AREA METALLIC CADMIUM POWDER AND AN ELECTRODE THEREFROM

[75] Inventor: Roy F. Thornton, Schenectady, N.Y.

[73] Assignee: General Electric Company, Schenectady, N.Y.

[22] Filed: Dec. 4, 1972

[21] Appl. No.: 311,866

[52] U.S. Cl. .................................................. 136/24
[51] Int. Cl. .......................................... H01m 43/04
[58] Field of Search................. 136/24; 75/.5 R, 109

[56] References Cited
UNITED STATES PATENTS

| | | | |
|---|---|---|---|
| 850,881 | 4/1907 | Edison | 136/24 X |
| 882,144 | 3/1908 | Edison | 136/24 |
| 3,066,178 | 11/1962 | Winkler | 136/24 |
| 3,068,310 | 12/1962 | Casey et al. | 136/24 |
| 3,288,643 | 11/1966 | Stark | 136/24 |
| 3,481,789 | 12/1969 | Winsel | 136/120 FC |
| 3,637,437 | 1/1972 | Goldberger | 136/120 FC |
| 3,674,710 | 7/1972 | Richter | 136/120 FC |

*Primary Examiner*—John H. Mack
*Assistant Examiner*—C. F. LeFevour
*Attorney, Agent, or Firm*—Paul R. Webb, II; Joseph T. Cohen; Jerome C. Squillaro

[57] ABSTRACT

A method of forming a high surface area metallic cadmium powder includes reducing cadmium oxide powder by forming a slurry with metallic zinc powder and an aqueous alkali hydroxide. A method is described for forming an electrode from such powder.

7 Claims, No Drawings

METHOD OF FORMING A HIGH SURFACE AREA METALLIC CADMIUM POWDER AND AN ELECTRODE THEREFROM

This invention relates to the formation of high surface area metallic cadmium powder and to the formation of electrodes therefrom for use in alkaline cells, and more particularly, it relates to the formation of such powder, which is charged, and to the formation of dry, charged cadmium electrodes.

High surface metallic cadmium powder can be formed into electrodes. In U.S. Pat. No. 3,184,338 issued May 18, 1965, there is discussed one prior art process in which secondary cadmium hydroxide negative electrodes designed for use in nickel-cadmium cells are generally prepared by impregnating a sintered nickel plaque with a suitable cadmium salt solution, such as a molten or saturated solution of cadmium nitrate, which is subsequently converted to cadmium hydroxide by electrochemical polarization or precipitation in an alkaline electrolyte.

In copending application Ser. No. 274,851, filed July 25, 1972, now U.S. Pat. No. 3,753,778 and entitled "Method of Forming Negative Electrodes" by Harold A. Christopher et al. there is described and claimed a method of forming a dry, charged negative electrode which includes electrochemically charging completely initially electrodeposited cadmium hydroxide thereby forming spongy metallic cadmium which is formed further into an electrode.

In order to manufacture mercuric oxide-cadmium primary cells with maximum energy density, it is necessary to assemble the cells using active materials in the charged condition. The characteristics of the mercuric oxide electrode are such that it is impossible to sufficiently electrochemically charge a discharged electrode.

The difficulties associated with the production of a dry, precharged cadmium electrode are that commercial cadmium powder is not suitably electrochemically active, and that electrochemically active powder is extremely reactive. The reactivity is such that unless proper procedures are followed, the powder will oxidize in air and lose capacity or under some circumstances actually ignite producing poisonous fumes of cadmium and cadmium oxide. Precharged cadmium electrodes are stable when immersed in electrolytes, but wet electrodes cause difficulties with cell assembly. Electrolyte films prevent satisfactory welding of metal cases and cause leakage problems with compression seals.

My present invention is directed to improved methods of forming a high surface area metallic cadmium powder and of forming dry, charged cadmium electrodes which overcomes the above difficulties.

It is a primary object of my invention to provide a dry, charged cadmium powder which is fabricated easily into negative electrodes.

In accordance with one aspect of my invention, such a method includes reducing cadmium oxide powder by forming a slurry with metallic zinc powder and an aqueous alkali hydroxide thereby forming high surface area metallic cadmium powder.

These and various other objects, features and advantages of the invention will be better understood from the following description.

I found unexpectedly that I could form high surface area or electrochemically active metallic cadmium powder suitable for making precharged cadmium electrodes. Cadmium oxide powder is reduced to metallic cadmium by forming a slurry with metallic zinc powder and an aqueous alkali hydroxide. The zinc reacts with the cadmium oxide to form oxidized zinc species and cadmium metal. The cadmium powder is then washed and dried to maintain it in the dry, charged metallic condition.

I found further that I could form dry, charged cadmium electrodes by mixing together cadmium oxide powder, zinc powder, and an aqueous alkali hydroxide in a suitable vessel. It is desirable that the zinc be in a slight stoichiometric excess to the cadmium oxide, and that sufficient aqueous alkali hydroxide, such as potassium hydroxide or sodium hydroxide be used to dissolve a substantial portion of the oxidized zinc species produced by the reaction. The zinc reacts with the cadmium oxide to form oxidized zinc species and cadmium metal. When the reaction is complete, which is assisted by gentle stirring, the excess zinc, if present, is electrochemically discharged. This can be accomplished without risk of oxidizing some cadmium by placing a platinum electrode in the electrolyte with its lead in electronic contact with the reacted mixture. The zinc is discharged while hydrogen is produced on the platinum. After the zinc is discharged, the mix is washed first with fresh aqueous alkali hydroxide solution to remove the dissolved oxidized zinc species. De-aerated distilled water or alcohol is then used to remove the alkali hydroxide. Complete removal of the hydroxide is critical to the subsequent stability of the dried powder. Exposure to air during the washing is to be avoided. The powder can then be dried under vacuum or by a stream of dry non-oxidizing gas such as nitrogen. However, the drying process is greatly facilitated if the water is removed by washing the powder with anhydrous alcohol. After removing the powder from the tank, the powder is compacted against at least one current collectors in a die. The resulting structure is a dry, nearly fully-charged cadmium electrode.

Various compacting pressures can be employed. Suitable current collectors includes meshes or screens of nickel, nickel plated steel, silver, copper or other metal alloys stable in a strong caustic electrolyte.

Examples of methods of forming high surface area metallic cadmium powder and of forming cadmium negative electrodes from such powder are set forth below.

A method of making such powder and electrodes in accordance with my invention is set forth below in Examples I and II. A method of making powder and an electrode not in accordance with my invention is set forth below in Example III.

EXAMPLE I 21.2 grams of cadmium oxide and 11.0 grams of zinc dust were mixed together in 105 cc of aqueous 31% potassium hydroxide. The major portion of the cadmium oxide was reacted within 5 minutes. Two grams of additional cadmium oxide and some additional zinc dust were added. After the reaction was complete, the excess zinc was discharged against a platinum electrode. The resulting charged metallic cadmium powder was washed with a fresh solution of aqueous potassium hydroxide to remove the dissolved zinc hydroxide. Distilled water was then employed as a rinse for the metallic cadmium powder to remove any remaining potassium hydroxide. Washing was continued until pH paper indicated a pH of 7. A final wash of methanol was employed before drying the metallic cadmium powder under vacuum. 20 grams of high surface area or charged metallic cadmium powder was produced by this method. The particle size of the powder was reduced by working the powder through a 20 mesh screen with a small spatula.

Two electrodes were then prepared from this charged metallic cadmium powder by compacting 7.88 grams and 8.17 grams respectively of the metallic cadmium powder between two silver mesh current collectors in a 1.1 inch × 1.32 inch die at a pressure of about 1,000 pounds per square inch. This procedure resulted in two dry, charged cadmium negative electrodes. The electrodes were 0.093 and 0.098 inches thick, respectively.

EXAMPLE II

Each of the two cadmium electrodes produced above in Example I were discharged at room temperature by employing 31% potassium hydroxide electrolyte and a mercuric oxide reference electrode. The results for these electrodes are set forth below in Table I.

TABLE I

| Electrode No. | 1 | 2 |
|---|---|---|
| Discharge Capacity | | |
| at 40 ma/ah | 2.52 | 2.64 |
| at 4 to 0.4 ma/ah | .028 | .036 |
| Total Discharge | | |
| Capacity amp hr | 2.55 | 2.68 |
| % Utilization of Cd | 68.0 | 69.0 |
| Amp hr/in$^3$ | 18.9 | 18.8 |

EXAMPLE III

A third metallic cadmium nickel electrode was prepared not in accordance with my invention to compare the performance against the above electrodes described in Examples I and II. This electrode was made by mixing together 21.2 grams of cadmium oxide powder and 1.1 grams of carbonyl nickel powder and electrochemically reducing the cadmium oxide in contact with a current collector to metallic cadmium powder. This reduction, which required several days resulted to a powder which was difficult to break into smaller particles suitable for fabricating an electrode.

4.27 grams of the combined cadmium powder and carbonyl nickel powder were compacted between two silver mesh current collectors in a 1.1 inch × 1.32 inch die at about 1,000 psi. The resulting metallic cadmium electrode was then evaluated in the same manner as the first two electrodes set forth above in Example II. The results are set forth below in Table II.

TABLE II

| Electrode No. | 3 |
|---|---|
| Discharge Capacity | |
| at 40 ma | 1.43 amp-hr |
| at 4 to 0.4 ma | 0 amp-hr |
| Total Discharge | |
| Capacity, amp hr | 1.43 |
| % Utilization of Cd | 74.0 |
| Amp hr/in$^3$ | 15.5 |

The following Examples IV to VII are set forth in which methods of making high surface area metallic cadmium powder and electrodes are in accordance with my invention.

EXAMPLE IV 100 grams of sieved cadmium oxide powder, 52 grams of zinc powder and 5 grams of carbonyl nickel powder were placed in a plastic jar and tumbled on a rolling mill for four days. Then the mix was sieved through a 20 mesh screen to break up lumps. 400 ml of 31% KOH was added to a glass jar and the powder added to the liquid with stirring. The mixture was then transferred to a stainless steel beaker. After 45 minutes during which the slurry was occasionally mixed the reaction to metallic cadmium was complete. The slurry was then transferred to a glass washing apparatus which was designed to allow a downflow of washing fluids through the reacted powder bed. A nitrogen blanket was maintained above the powder bed at all times. The powder bed was then flushed with fresh 31% KOH. After standing for 1¾ hours, a platinum electrode was placed on top of the powder bed. No hydrogen evolution ensued indicating that no excess zinc powder remained. Fresh 31% KOH was flushed through the bed. Additional fresh 31% KOH was added to the apparatus, after which it was allowed to stand overnight. Fresh 31% KOH was flushed through the bed the following morning so that the cadmium powder was essentially free of oxidized zinc species. The bed was then flushed for 1¼ hours with water to remove all KOH. The apparatus was flushed with methanol and then allowed to stand overnight filled with methanol. The bed was then washed with several changes of anhydrous methanol to remove the water. The bulk of the methanol was drained from the bed assisted by a purge with dry nitrogen. The apparatus was then evacuated to evaporate off the methanol. Evacuation was continued until the pressure dropped below 50 microns. Nitrogen gas and a small amount of air were admitted to the apparatus and the powder allowed to stand for about one hour. The dull gray powder was then forced through a 20 mesh screen and packaged for storage.

EXAMPLE V 100 grams of sieved cadmium oxide powder, 60 grams of zinc powder and 10 grams of carbonyl nickel powder were placed in a plastic jar and tumbled on a rolling mill until mixed. Then the mix was sieved to break up lumps. 500 ml of 31% KOH was added to a stainless steel beaker and the powder added to the liquid with stirring. After 20 minutes, during which the slurry was occasionally mixed the reaction to metallic cadmium was complete. The slurry was then transferred to a glass washing apparatus which was designed to allow a downflow of washing fluids through the reacted powder bed. A nitrogen blanket was maintained above the powder bed at all times. The powder bed was then flushed with fresh 31% KOH and a platinum electrode was placed on top of the powder bed. Vigorous hydrogen evolution ensued indicating that the excess zinc powder was being oxidized. When the hydrogen evolution had ceased indicating that all metallic zinc had been consumed, fresh 31% KOH was flushed through the bed until the cadmium powder was essentially free of oxidized zinc species. The bed was then flushed with distilled de-aerated water until the pH was less than 10 according to a pH meter, and neutral according to pH paper. The bed was then washed with several changes of anhydrous methanol over a period of about seven hours. The bulk of the methanol was drained from the bed assisted by a purge with dry nitrogen, and the apparatus was then evacuated to evaporate off the methanol. Evacuation was continued until the pressure dropped below 50 microns. Nitrogen gas and a small amount of air were admitted to the apparatus and the powder allowed to stand for about one hour. The dull gray powder was then forced through a 20 mesh screen and packaged for storage.

EXAMPLE VI 500 grams of cadmium oxide powder, and 260 grams of zinc powder were tumbled on a rolling mill for about 4½ hours. The mixed powder was sieved through a 20 mesh screen. The mixed powder was added with stirring to 2 liters of 31% KOH in a stainless steel pan. During the next 75 minutes, the mix was stirred occasionally, 10 additional grams of zinc were added in 3 parts, and 400 ml additional 31% KOH was added. The reacted mixture was then put into the same glass washing apparatus described in Example IV. The powder bed was flushed with clean 31% KOH and platinum electrodes placed on top of the bed to react the metallic zinc. Complete reaction of the zinc to oxidized zinc required about 40 hours because of the large excess of zinc added. Subsequent batches required considerably less time. The total consumption of 31% KOH was about 10 liters. The powder bed was then washed overnight with de-aerated distilled water. About 2.5 gallons were used. The bed was then washed with methanol. Total methanol washing period required about 5 hours and about 5½ liters of methanol were used. The washing apparatus was then evacuated and the methanol evaporated. Evacuation was continued until the pressure was less than 35 microns. Nitrogen and a small amount of air were admitted and the powder allowed to stand more than one hour. The powder was then sieved through 20 mesh screen and packaged for storage.

EXAMPLE VII

Electrodes were fabricated from the batches of cadmium powder from Examples IV, V, and VI by compacting a given weight of powder between two nickel mesh current collectors. The thickness of the electrodes was controlled by the use of shims to stop the travel of the press at the desired point. Pressure in excess of that required to compact the powder in the absence of stops was used. The pressing die was 1.1 inch × 1.32 inch. Each current collector had a separate electrical lead. The two leads for each electrode were connected prior to test.

Other configurations of current collectors which were tested included two collectors, one on one outside major surface and one in the center of the powder compact, one collector on the one outside major surface, and one collector centrally located in the powder compact.

The performance of the electrodes is set forth below in Table III. Electrodes 4 and 5 were made from the cadmium powder of Example IV. Electrodes 6, 7 and 8 were made from the cadmium powder of Example V. Electrodes 9 and 10 were made from the cadmium powder of Example VI. The charge capacities shown in Table III were measured immediately, before any discharge, and are a measure of the amount of oxidized cadmium present in the dry, charged electrode.

TABLE III

| Electrode No. | Weight of powder-gms | Thickness -inches | Charge capacity-amp-hr | Discharge capacity-amp-hr |
|---|---|---|---|---|
| 4 | 10.0 | 0.115 | — | 2.7 |
| 5 | 10.0 | 0.115 | — | 2.8 |
| 6 | 9.96 | 0.116 | 0.11 | 2.9 |
| 7 | 9.97 | 0.116 | Not Measured | 3.4 |
| 8 | 10.48 | 0.116 | Not Measured | 3.6 |
| 9 | 11.00 | 0.129 | Not Measured | 4.1 |
| 10 | 11.01 | 0.129 | 0.09 | 4.2 |

While other modifications of the invention and variations thereof, which may be employed within the scope of the invention have not been described, the invention is intended to include such as may be embraced within the following claims.

What I claim as new and desire to secure by letters Patent of the United States is:

1. A method of forming a high surface area metallic cadmium powder which consists of mixing together cadmium oxide powder, and zinc powder in an aqueous alkali hydroxide solution to form a slurry, reaacting the mixture thereby forming metallic cadmium powder and oxidized zinc species, washing the metallic cadmium powder and oxidized zinc species with a second aqueous alkali hydroxide solution thereby removing the oxidized zinc species, washing the metallic cadmium powder thereby removing the alkali hydroxide, and drying the metallic cadmium powder.

2. A method of forming a high surface area metallic cadmium powder as in claim 1, in which the last washing of the metallic cadmium powder is with de-aerated distilled water.

3. A method of forming a high surface area metallic cadmium powder as in claim 1, in which the last washing of the metallic cadmium powder is with alcohol.

4. A method of forming a high surface area metallic cadmium powder as in claim 1, in which the last washing of the metallic cadmium powder is with de-aerated distilled water and then alcohol.

5. A method of forming a high surface area metallic cadmium powder as in claim 1, in which the zinc powder is added in a stoichiometric excess thereby providing residual zinc powder in the solution, and the zinc powder is removed.

6. A method of forming a high surface area metallic cadmium powder as in claim 5, in which the residual zinc is removed by electrochemical discharge.

7. A method of forming a dry, charged cadmium negative electrode in which the metallic cadmium powder formed as in claim 1, is compressed against at least one mesh current collector.

* * * * *